United States Patent
Miller et al.

(10) Patent No.: US 9,529,569 B2
(45) Date of Patent: Dec. 27, 2016

(54) METHOD AND APPARATUS FOR RANDOMIZER

(71) Applicant: MoSys, Inc., Santa Clara, CA (US)

(72) Inventors: Michael J Miller, Saratoga, CA (US); Michael J Morrison, Sunnyvale, CA (US); Jay B Patel, Los Gatos, CA (US)

(73) Assignee: MoSys, Inc., Santa Clara, CA (US)

( * ) Notice: Subject to any disclaimer, the term of this patent is extended or adjusted under 35 U.S.C. 154(b) by 0 days.

(21) Appl. No.: 14/839,576

(22) Filed: Aug. 28, 2015

(65) Prior Publication Data

US 2016/0019029 A1 Jan. 21, 2016

Related U.S. Application Data

(63) Continuation of application No. PCT/US2014/072870, filed on Dec. 30, 2014.

(60) Provisional application No. 61/922,592, filed on Dec. 31, 2013.

(51) Int. Cl.
G06F 7/58 (2006.01)

(52) U.S. Cl.
CPC .................................. G06F 7/582 (2013.01)

(58) Field of Classification Search
None
See application file for complete search history.

(56) References Cited

U.S. PATENT DOCUMENTS

| | | |
|---|---|---|
| 5,745,522 A | 4/1998 | Heegard |
| 2004/0205094 A1 | 10/2004 | Griessing |
| 2006/0206557 A1 | 9/2006 | Wong |
| 2012/0201373 A1 | 8/2012 | Hua et al. |
| 2012/0290783 A1 | 11/2012 | Chung |
| 2013/0332788 A1 | 12/2013 | Singh |

*Primary Examiner* — Michael D Yaary
(74) *Attorney, Agent, or Firm* — Heimlick Law, PC; Alan Heimlich, Esq.

(57) ABSTRACT

A Method and Apparatus for Randomizer has been disclosed. In one implementation a sequence of randomized connections then exclusive-OR operations and then an adder produce a randomized output.

20 Claims, 12 Drawing Sheets

METHOD AND APPARATUS FOR RANDOMIZER

RELATED APPLICATION

The present application for patent claims priority to U.S. Patent Application No. 61/922,592 titled "HASHING CIRCUIT" filed Dec. 31, 2013, expired, and which is hereby incorporated herein by reference. The present application for patent claims priority to, and is a continuation of, PCT/US2014/072870 titled "Method and Apparatus for Randomizer" filed Dec. 30, 2014, pending, and which is hereby incorporated herein by reference.

FIELD OF THE INVENTION

The present invention pertains to randomizing data. More particularly, the present invention relates to a Method and Apparatus for Randomizer.

BACKGROUND OF THE INVENTION

Many areas of computing and communications need to randomize data for a variety of reasons. Software approaches are too slow. This presents a technical problem for which a technical solution using a technical means is needed.

BRIEF DESCRIPTION OF THE DRAWINGS

The invention is illustrated by way of example and not limitation in the figures of the accompanying drawings.

DETAILED DESCRIPTION

In one embodiment of the invention, the width of the input can be cascaded to any desired width. For example, but not limited to from 48 bits to greater than 512 bits.

In one embodiment of the invention, the wider input width can be extended in 72 bit increments. In one embodiment of the invention extending the input an additional 72 bits and only introduces a delay of 0.666 ns with a 1.5 GHz clock.

In one embodiment of the invention, the randomizer can be implemented as a very fast pipelined architecture. In one embodiment of the invention a pipeline stage can have exclusive-ors (XOR) and an arithmetic logic unit (ALU). In one embodiment of the invention the pipeline stage can be run at high frequencies (multiple GHz).

In one embodiment of the invention, the output has a substantially uniformly distributed output. That is the output has uniform results across all bits.

In one embodiment of the invention, the output has a substantially uniformly distributed output even when the inputs are substantially the same.

In one embodiment the invention can handle data coming in every 6 ns.

In one embodiment of the invention there is very short delay and 144 bit input can be accepted at a 1.5 GHz clock cycle.

In one embodiment of the invention, subfields of the output can be used independently.

Figure 1:
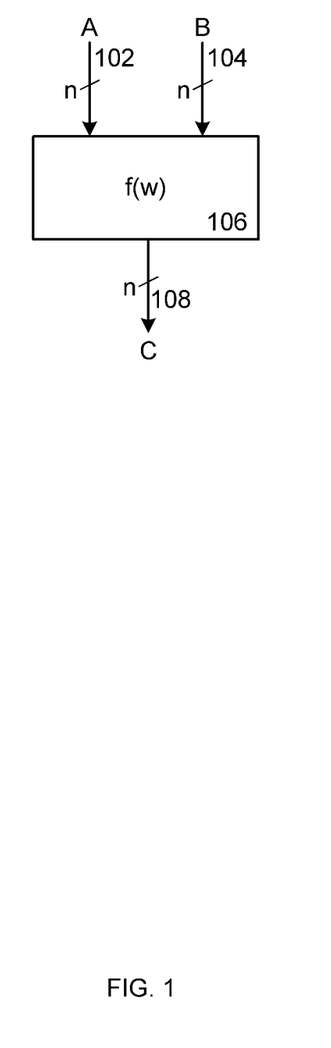
FIG. 1 illustrates one embodiment of the invention showing in block diagram form a single stage of a randomizer.

FIG. 1 shows, generally at 100, one embodiment of the invention showing a block diagram of a single stage of a randomizer. At 102 is an input A of a data width n. At 104 is an input B of a data width n. At 106 is the randomizer function denoted f(w). At 108 is an output C having a data width n. In one embodiment of the invention n equals 72 bits (also denoted 72 b). The inputs 102 A and 104 B comprise an input of 144 bits (144 b) and the output 108 C is 72 bits wide.

Figure 2:
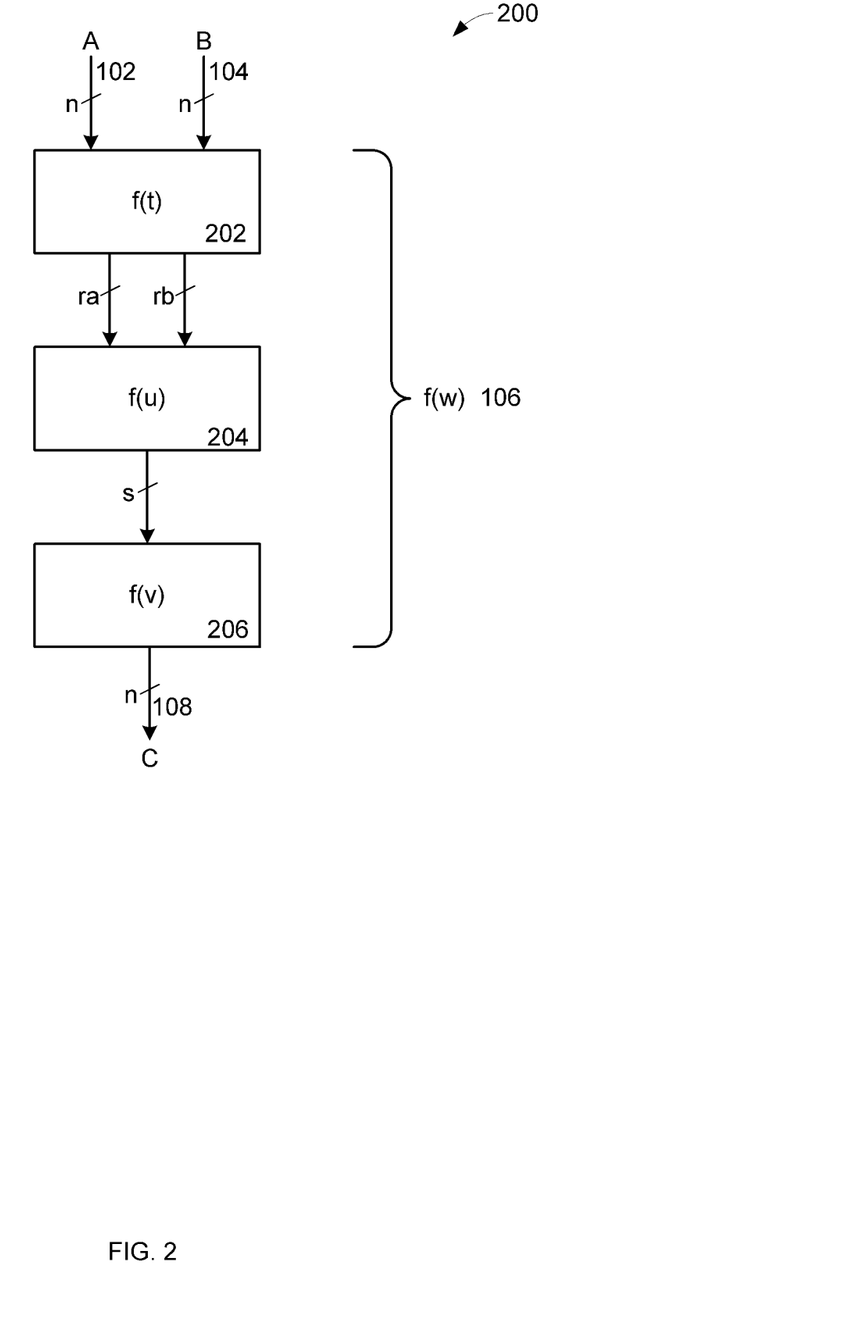
FIG. 2 shows one embodiment of the invention showing in block diagram form more detail of FIG. 1.

FIG. 2 shows, generally at 200, one embodiment of the invention showing in block diagram form more detail of FIG. 1 106 f(w). In FIG. 2 f(w) 106 has a function f(t) 202 that has two outputs of width ra and rb which both go into function f(u) 204 that has an output of width s that goes into function f(v) 206, As shown in FIG. 1, FIG. 2 has at 102 an input A of a data width n, at 104 an input B of a data width n, and at 108 is an output C having a data width n.

Figure 3:
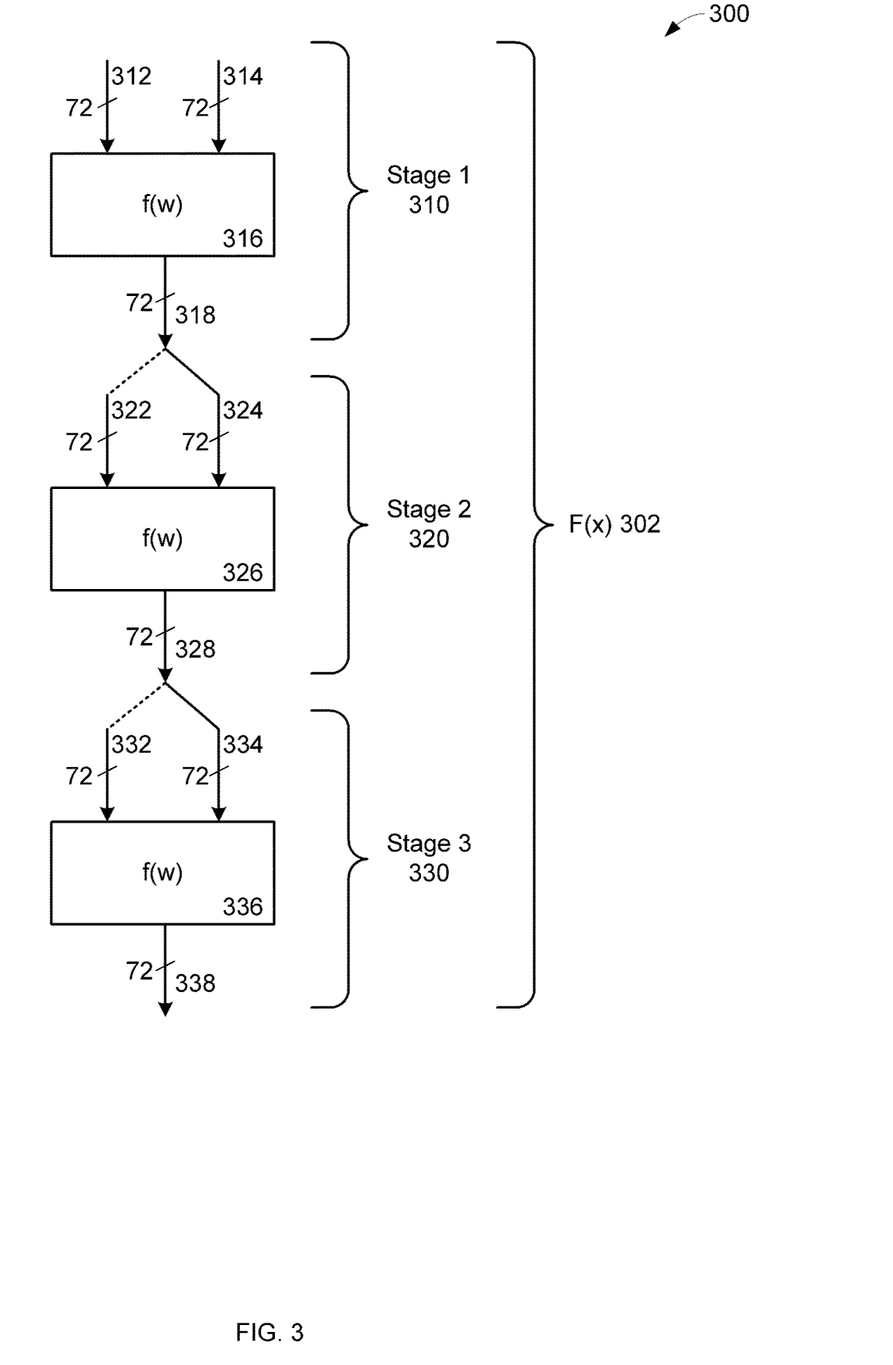
FIG. 3 illustrates one embodiment of the invention showing three single stages in series.

FIG. 3 shows, generally at 300, one embodiment of the invention showing in block diagram form a full randomizer F(x) 302 that in this case has 3 single stages in series. In this embodiment we have set n to 72 for illustrative purposes. Stage 1 310 has inputs 312 and 314 and output 318. Stage 2 320 has inputs 322 and 324 and output 328. Stage 3 330 has inputs 332 and 334 and output 338. The 318 to 322 connection is shown by a dashed line indicating that it is optional. That is 318 can connect to 322, alternatively 322 can connect to a source of logic zeros (0's), or logic ones (1's), or any consistent random pattern (i.e. the input to 322 does not change while the circuit is in operation). Also of note output 318 could have gone to 322 with the 318 to 324 connection being the optionally connected node.

Likewise for 328, 334, and 332, the 328 to 332 connection is shown by a dashed line indicating that it is optional. That is 328 can connect to 332, alternatively 338 can connect to a source of any logic values as long as they remain consistent, that is not changing, while the circuit is in operation, for example: logic zeros (0's), or logic ones (1's), or any consistent random pattern (i.e. the input to 332 does not change while the circuit is in operation). Also of note output 328 could have gone to 332 with the 328 to 334 connection being the optionally connected node.

Figure 4:
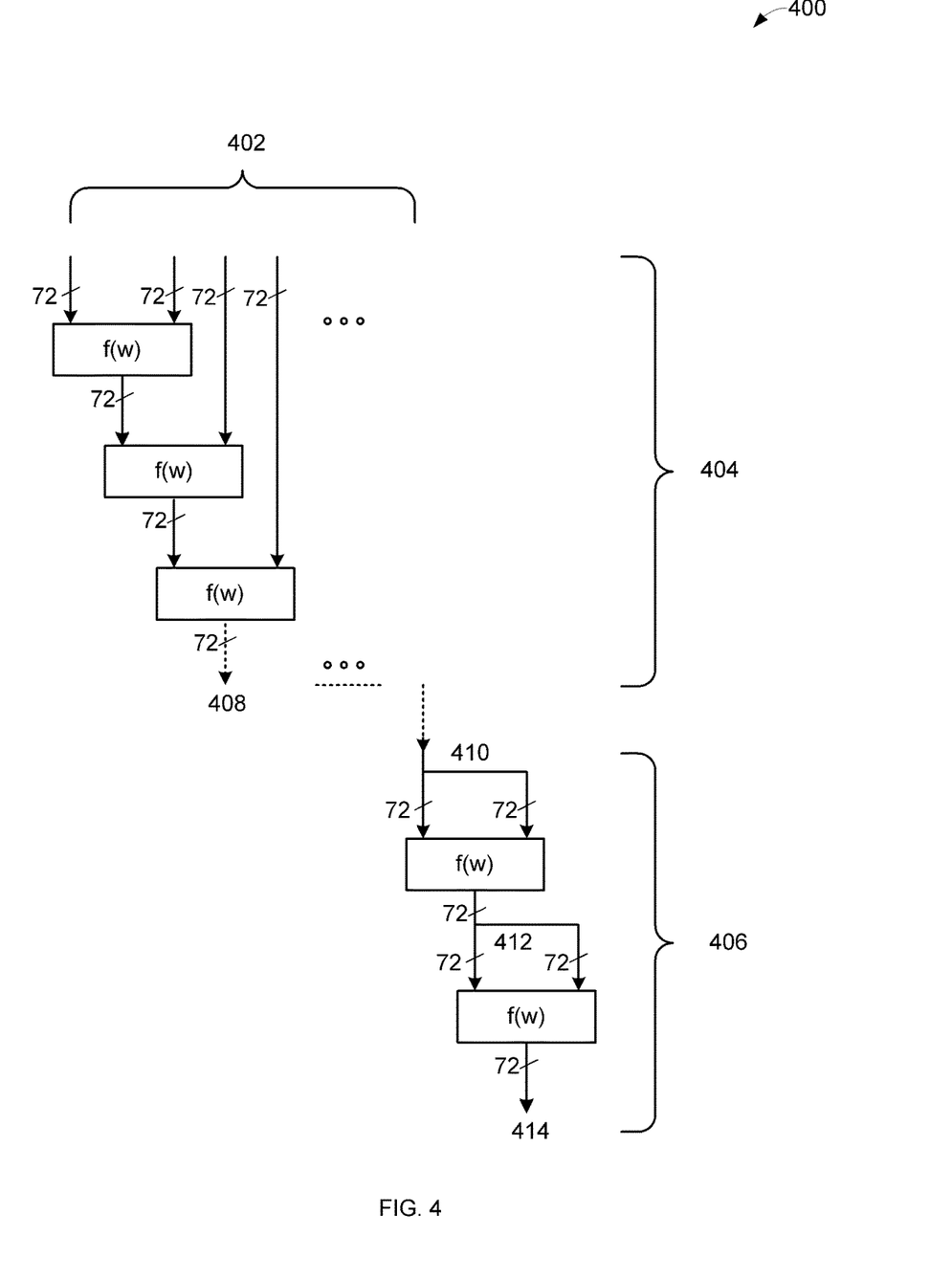
FIG. 4 illustrates one embodiment of the invention showing one approach to expanding the width.
Figure 5:
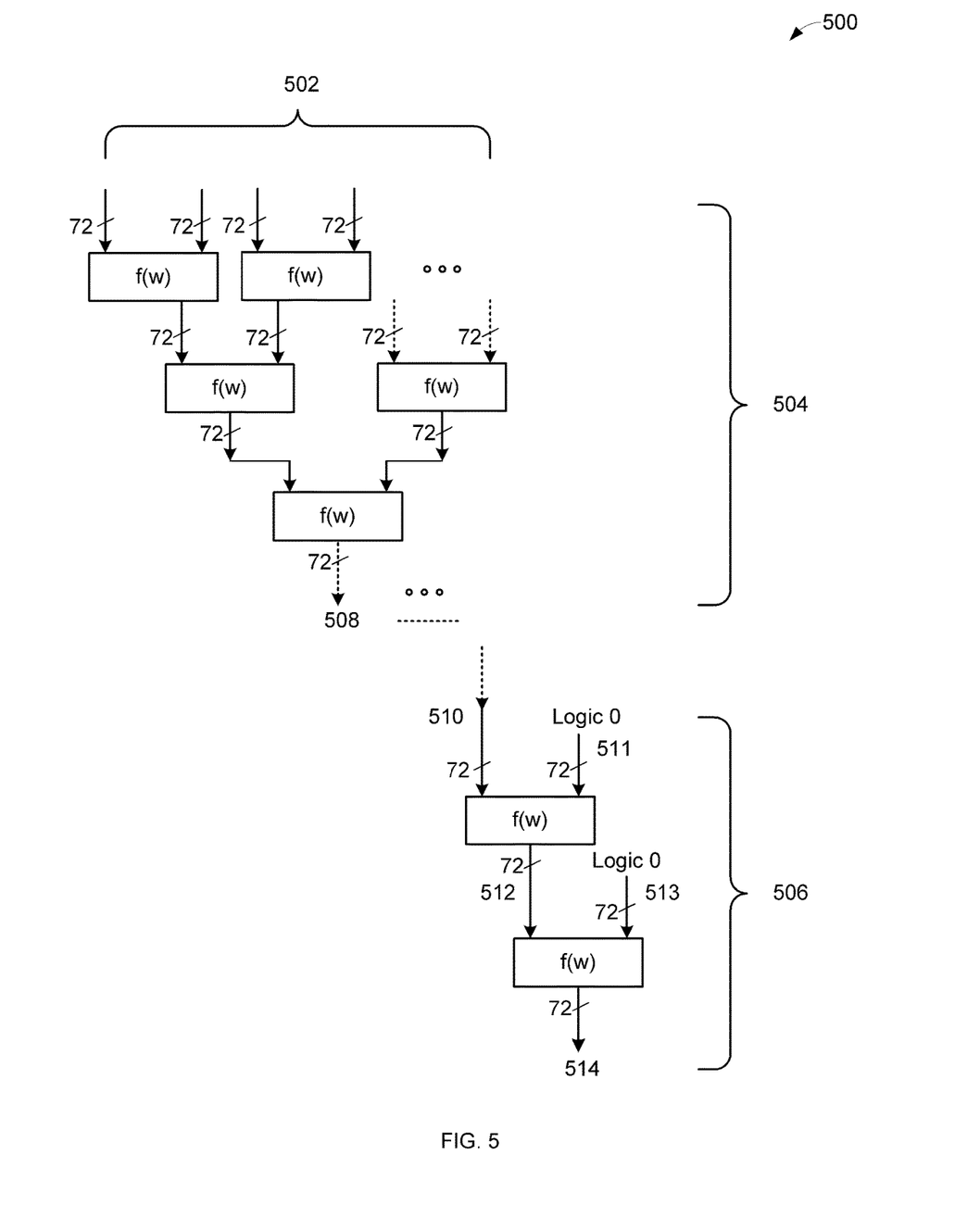
FIG. 5 illustrates one embodiment of the invention showing another approach to expanding the width.

As previously noted the number of input bits can be expanded. By cascading the f(w) single stage randomizer the input bit width can be expanded. One of skill in the art will appreciate that there are many possible configurations. FIG. 4 and FIG. 5 illustrate two such configurations.

FIG. 4 shows, generally at 400, an embodiment of the invention showing cascading of the single stage randomizer f(w) to illustrate how to achieve inputs of greater than 144 bits. Again the illustrated embodiment uses a width of 72 bits however the invention is not so limited. At 402 is any desired width by cascading f(w) 404. At 408 is the output shown by a dashed line of such cascading which goes in this embodiment shown by a dashed line to 410 and two more rounds of the single stage randomizer f(w) as illustrated at 406 resulting in an output at 414. As noted above the inputs at 410 and 412 can be tied to any consistent input that does not vary during the operation of the circuit. Here 410 and 412 feed respectively both inputs to the corresponding f(w) block. What is to be appreciated is that any desired width of input bits can be achieved. While this embodiment shows at 406 two rounds after the last input, the invention is not so limited and more rounds can be used.

FIG. 5 shows, generally at 500, an embodiment of the invention showing another approach to cascading of the single stage randomizer f(w) to illustrate how to achieve inputs of greater than 144 bits. Again the illustrated embodiment uses a width of 72 bits however the invention is not so limited. At 502 is any desired width by cascading f(w) 504. At 508 is the output shown by a dashed line of such cascading which goes in this embodiment shown by a dashed line to 510 and two more rounds of the single stage randomizer f(w) as illustrated at 506 resulting in an output at 514. As noted above the inputs at 511 and 513 can be tied to any consistent input that does not vary during the operation of the circuit. Here 511 and 513 are tied to Logic 0. What is to be appreciated is that any desired width of input bits can be achieved. While this embodiment shows at 506 two rounds after the last input, the invention is not so limited and more rounds can be used.

Figure 6:
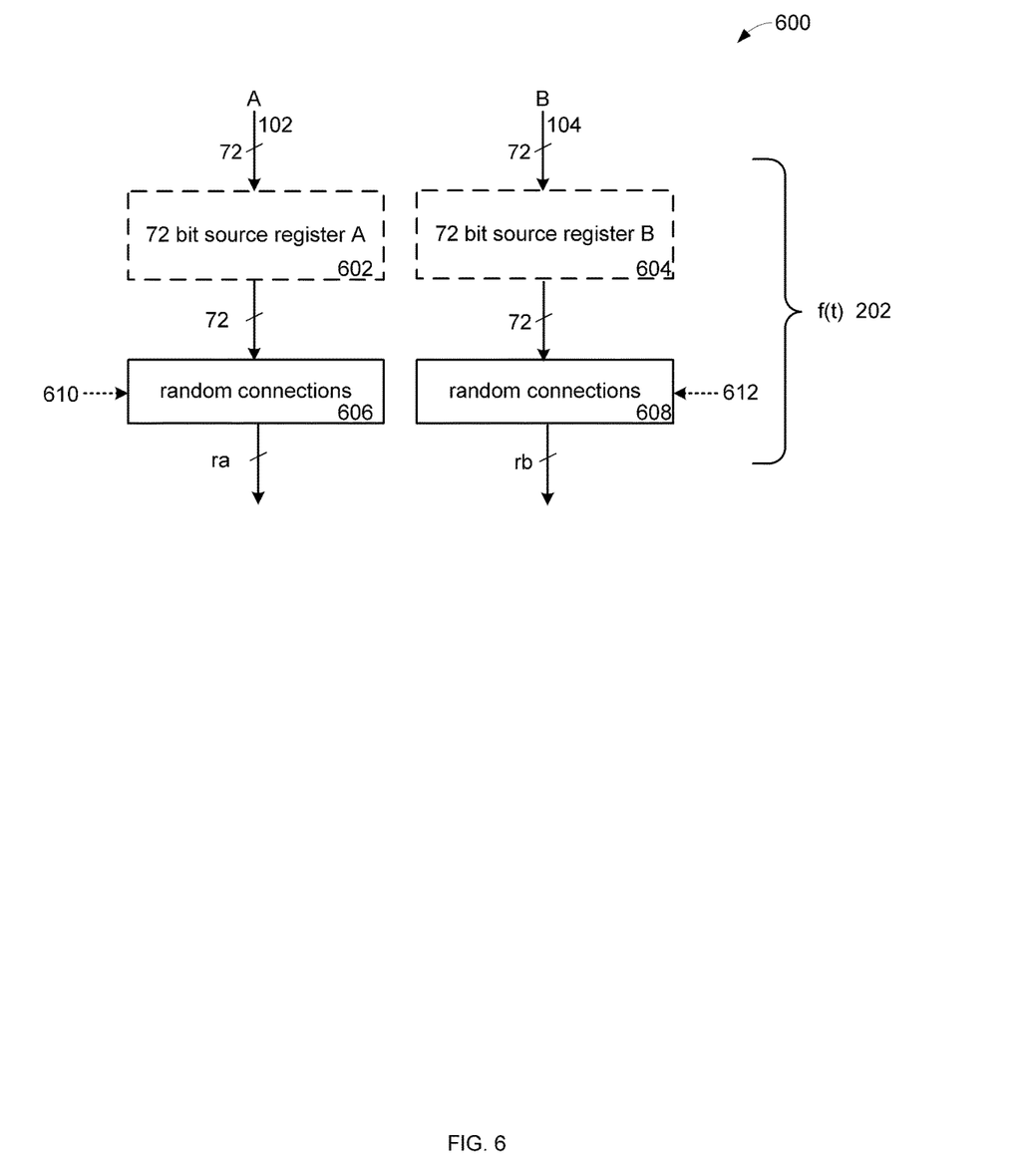
FIG. 6 illustrates one embodiment of the invention showing two random connections boxes.

FIG. 6 shows, generally at 600, an embodiment of the invention showing the function f(t) as shown in FIG. 2 at 202. In one embodiment of the invention, the inputs A 102 and B 104 go into and are stored in a source register A 602 and source register B 604. In this way the inputs (A and B) can change while the circuit is operating. However the invention is not so limited and in another embodiment of the invention the inputs A and B go directly to the randomized connection block 606. In this illustration we have n=72 bits. At 606 and 608 are random connections that result in outputs of width ra and rb respectively. In one embodiment the 72 bits into random connections 606 results in ra having a width of 576 bits. That is the 72 bits input at A 102 results in 576 bits ra out of 606. Likewise in one embodiment the 72 bits into random connections 608 results in rb having a width of 576 bits. That is the 72 bits input at B 104 results in 576 bits rb out of 608. The random connections at 606 and 608 are cross connections that are lacking any structure or pattern. The criterion is that taking the mapping of any arbitrary consecutive set of inputs mapped to outputs, there are not consecutive inputs to output pairs with the same exact relative pattern. In this embodiment each input bit for A is mapped or cross connected in random connections 606 to 8 outputs in ra. Thus in this example each of the 72 bits input on A result in 8 outputs in ra for a total of 72*8=576 bits. This same approach is used for inputs from B and out of random connections 608 rb has 576 bits. This cross connection can be generated by any mechanism that results in the criterion being met.

In FIG. 6 optional signals 610 and 612 can select variations of the random connections 606 and 608 respectively. That is independently 610 and 612 can select different random cross connections to be used for A and B.

Table 1 illustrates one such cross connection for both random connections 606 having a 72 bit input A (bits denoted 0-71), and a 576 bit output ra (bits denoted 0-575), and for random connections 608 having a 72 bit input B (0-71), and a 576 bit output rb (0-575). As can be seen each input bit results in being mapped or connected to 8 output bits.

TABLE 1

| A Input (0-71) | ra Output (0-575) | | | | | | | |
|---|---|---|---|---|---|---|---|---|
| 0 | 56 | 120 | 192 | 248 | 288 | 368 | 480 | 504 |
| 1 | 57 | 96 | 193 | 264 | 336 | 369 | 481 | 536 |
| 2 | 8 | 80 | 184 | 256 | 337 | 416 | 432 | 512 |
| 3 | 24 | 136 | 176 | 249 | 320 | 360 | 488 | 520 |
| 4 | 0 | 104 | 152 | 250 | 304 | 384 | 448 | 552 |
| 5 | 9 | 72 | 168 | 265 | 289 | 370 | 440 | 513 |
| 6 | 58 | 128 | 208 | 257 | 296 | 361 | 449 | 537 |
| 7 | 10 | 97 | 185 | 240 | 290 | 408 | 489 | 544 |
| 8 | 32 | 81 | 177 | 251 | 291 | 409 | 490 | 505 |
| 9 | 64 | 88 | 160 | 216 | 338 | 410 | 441 | 538 |
| 10 | 40 | 121 | 169 | 232 | 344 | 385 | 450 | 514 |
| 11 | 33 | 122 | 209 | 217 | 305 | 417 | 451 | 560 |
| 12 | 48 | 89 | 170 | 266 | 328 | 371 | 496 | 545 |
| 13 | 1 | 98 | 178 | 272 | 339 | 411 | 497 | 521 |
| 14 | 2 | 90 | 171 | 241 | 297 | 386 | 464 | 568 |
| 15 | 16 | 112 | 194 | 224 | 321 | 424 | 456 | 553 |
| 16 | 17 | 73 | 144 | 258 | 312 | 425 | 482 | 554 |
| 17 | 65 | 91 | 186 | 273 | 345 | 372 | 457 | 569 |
| 18 | 49 | 82 | 153 | 242 | 298 | 392 | 433 | 506 |
| 19 | 41 | 99 | 161 | 243 | 313 | 426 | 483 | 561 |
| 20 | 25 | 137 | 195 | 252 | 314 | 418 | 442 | 507 |
| 21 | 42 | 105 | 187 | 259 | 299 | 373 | 498 | 539 |
| 22 | 3 | 92 | 162 | 233 | 329 | 419 | 465 | 508 |
| 23 | 4 | 74 | 210 | 234 | 322 | 362 | 452 | 515 |
| 24 | 26 | 106 | 188 | 274 | 300 | 393 | 472 | 570 |
| 25 | 59 | 113 | 145 | 218 | 352 | 363 | 484 | 528 |
| 26 | 60 | 138 | 163 | 244 | 323 | 412 | 491 | 516 |
| 27 | 50 | 123 | 189 | 219 | 346 | 427 | 443 | 571 |
| 28 | 18 | 139 | 200 | 280 | 353 | 420 | 444 | 522 |
| 29 | 11 | 129 | 201 | 225 | 306 | 421 | 445 | 517 |
| 30 | 66 | 114 | 190 | 235 | 330 | 376 | 473 | 572 |
| 31 | 27 | 107 | 179 | 260 | 354 | 400 | 492 | 546 |
| 32 | 19 | 83 | 211 | 236 | 324 | 413 | 493 | 555 |
| 33 | 67 | 84 | 180 | 245 | 347 | 401 | 466 | 547 |
| 34 | 28 | 100 | 181 | 220 | 331 | 387 | 499 | 523 |
| 35 | 20 | 101 | 172 | 237 | 292 | 402 | 474 | 540 |
| 36 | 12 | 102 | 196 | 238 | 315 | 388 | 467 | 524 |
| 37 | 13 | 108 | 164 | 267 | 355 | 377 | 458 | 562 |
| 38 | 21 | 140 | 154 | 268 | 332 | 364 | 453 | 563 |
| 39 | 5 | 93 | 202 | 261 | 301 | 394 | 459 | 556 |
| 40 | 29 | 109 | 197 | 281 | 348 | 378 | 460 | 541 |
| 41 | 61 | 130 | 173 | 282 | 349 | 374 | 446 | 509 |
| 42 | 34 | 124 | 198 | 221 | 325 | 403 | 434 | 529 |
| 43 | 68 | 75 | 182 | 222 | 293 | 428 | 485 | 557 |
| 44 | 43 | 115 | 165 | 226 | 307 | 429 | 435 | 573 |
| 45 | 62 | 125 | 155 | 275 | 316 | 379 | 454 | 525 |
| 46 | 51 | 94 | 146 | 262 | 317 | 422 | 486 | 548 |
| 47 | 30 | 76 | 174 | 246 | 302 | 365 | 487 | 549 |
| 48 | 52 | 141 | 147 | 276 | 326 | 395 | 436 | 530 |
| 49 | 44 | 126 | 203 | 223 | 308 | 404 | 468 | 531 |
| 50 | 6 | 116 | 204 | 283 | 350 | 380 | 469 | 564 |
| 51 | 69 | 117 | 212 | 253 | 333 | 366 | 500 | 510 |
| 52 | 53 | 142 | 205 | 227 | 334 | 389 | 475 | 518 |
| 53 | 70 | 85 | 156 | 254 | 340 | 414 | 437 | 542 |
| 54 | 45 | 86 | 206 | 263 | 341 | 390 | 455 | 526 |
| 55 | 22 | 118 | 207 | 255 | 309 | 415 | 461 | 527 |
| 56 | 46 | 119 | 213 | 284 | 351 | 423 | 501 | 511 |
| 57 | 23 | 131 | 148 | 228 | 356 | 367 | 494 | 532 |
| 58 | 35 | 132 | 166 | 269 | 294 | 430 | 476 | 550 |
| 59 | 7 | 77 | 191 | 239 | 318 | 381 | 502 | 565 |
| 60 | 71 | 78 | 167 | 277 | 357 | 375 | 438 | 574 |
| 61 | 54 | 127 | 149 | 247 | 358 | 391 | 477 | 551 |
| 62 | 55 | 110 | 214 | 270 | 295 | 405 | 462 | 575 |
| 63 | 36 | 95 | 199 | 278 | 327 | 396 | 495 | 558 |
| 64 | 63 | 103 | 157 | 285 | 359 | 431 | 503 | 543 |
| 65 | 37 | 143 | 150 | 229 | 303 | 397 | 439 | 566 |
| 66 | 38 | 133 | 215 | 279 | 342 | 382 | 478 | 567 |
| 67 | 14 | 111 | 183 | 230 | 310 | 406 | 479 | 519 |
| 68 | 39 | 79 | 158 | 271 | 311 | 398 | 470 | 559 |
| 69 | 15 | 87 | 175 | 231 | 343 | 407 | 463 | 533 |
| 70 | 31 | 134 | 151 | 286 | 319 | 399 | 447 | 534 |

TABLE 1-continued

| | | | | | | | | |
|---|---|---|---|---|---|---|---|---|
| 71 | 47 | 135 | 159 | 287 | 335 | 383 | 471 | 535 |

| B Input (0-71) | rb Output (0-575) | | | | | | | |
|---|---|---|---|---|---|---|---|---|
| 0 | 32 | 72 | 152 | 216 | 344 | 368 | 472 | 512 |
| 1 | 24 | 136 | 192 | 224 | 312 | 400 | 464 | 536 |
| 2 | 25 | 137 | 193 | 240 | 352 | 408 | 473 | 552 |
| 3 | 48 | 138 | 168 | 241 | 336 | 409 | 465 | 568 |
| 4 | 40 | 96 | 176 | 242 | 320 | 376 | 466 | 528 |
| 5 | 16 | 88 | 208 | 225 | 321 | 410 | 496 | 569 |
| 6 | 0 | 73 | 153 | 248 | 304 | 369 | 456 | 537 |
| 7 | 33 | 120 | 169 | 249 | 353 | 360 | 488 | 520 |
| 8 | 64 | 89 | 144 | 217 | 305 | 411 | 432 | 504 |
| 9 | 17 | 139 | 145 | 250 | 354 | 377 | 489 | 505 |
| 10 | 49 | 140 | 170 | 226 | 328 | 370 | 497 | 538 |
| 11 | 41 | 90 | 171 | 251 | 329 | 392 | 474 | 544 |
| 12 | 42 | 80 | 184 | 227 | 355 | 424 | 480 | 521 |
| 13 | 65 | 121 | 194 | 252 | 313 | 412 | 457 | 529 |
| 14 | 18 | 112 | 154 | 272 | 345 | 378 | 481 | 539 |
| 15 | 1 | 104 | 155 | 273 | 337 | 384 | 475 | 560 |
| 16 | 34 | 81 | 172 | 280 | 330 | 361 | 440 | 553 |
| 17 | 50 | 113 | 185 | 243 | 288 | 362 | 467 | 554 |
| 18 | 56 | 114 | 200 | 281 | 322 | 379 | 498 | 513 |
| 19 | 57 | 97 | 146 | 256 | 331 | 425 | 499 | 561 |
| 20 | 66 | 115 | 160 | 264 | 289 | 380 | 482 | 570 |
| 21 | 51 | 98 | 201 | 253 | 356 | 401 | 483 | 545 |
| 22 | 67 | 82 | 209 | 274 | 346 | 416 | 433 | 522 |
| 23 | 26 | 116 | 210 | 282 | 314 | 417 | 448 | 546 |
| 24 | 68 | 128 | 195 | 257 | 338 | 393 | 434 | 506 |
| 25 | 43 | 141 | 161 | 228 | 296 | 413 | 476 | 530 |
| 26 | 58 | 99 | 211 | 283 | 297 | 385 | 484 | 547 |
| 27 | 59 | 122 | 186 | 284 | 339 | 426 | 441 | 514 |
| 28 | 8 | 129 | 162 | 232 | 306 | 386 | 477 | 548 |
| 29 | 2 | 130 | 156 | 258 | 332 | 402 | 500 | 555 |
| 30 | 60 | 74 | 202 | 265 | 298 | 381 | 485 | 515 |
| 31 | 61 | 131 | 203 | 233 | 357 | 363 | 435 | 516 |
| 32 | 19 | 91 | 177 | 285 | 358 | 364 | 449 | 540 |
| 33 | 52 | 83 | 178 | 244 | 307 | 371 | 490 | 507 |
| 34 | 3 | 123 | 147 | 218 | 340 | 418 | 436 | 556 |
| 35 | 27 | 75 | 179 | 219 | 290 | 403 | 458 | 557 |
| 36 | 44 | 100 | 187 | 259 | 347 | 404 | 501 | 549 |
| 37 | 35 | 124 | 163 | 260 | 341 | 394 | 450 | 531 |
| 38 | 45 | 76 | 196 | 261 | 299 | 395 | 451 | 550 |
| 39 | 28 | 101 | 212 | 262 | 348 | 427 | 459 | 541 |
| 40 | 20 | 92 | 157 | 245 | 308 | 419 | 491 | 532 |
| 41 | 69 | 102 | 213 | 234 | 349 | 387 | 442 | 562 |
| 42 | 36 | 125 | 188 | 266 | 300 | 388 | 437 | 517 |
| 43 | 70 | 103 | 164 | 220 | 315 | 420 | 468 | 523 |
| 44 | 21 | 105 | 197 | 235 | 323 | 365 | 460 | 533 |
| 45 | 29 | 132 | 180 | 246 | 333 | 389 | 469 | 558 |
| 46 | 9 | 84 | 165 | 267 | 324 | 396 | 443 | 524 |
| 47 | 10 | 93 | 148 | 229 | 301 | 405 | 502 | 518 |
| 48 | 11 | 133 | 189 | 254 | 342 | 366 | 492 | 525 |
| 49 | 71 | 126 | 149 | 275 | 316 | 382 | 438 | 571 |
| 50 | 62 | 134 | 166 | 247 | 302 | 390 | 503 | 572 |
| 51 | 53 | 117 | 190 | 268 | 303 | 414 | 461 | 559 |
| 52 | 4 | 77 | 204 | 286 | 334 | 421 | 462 | 508 |
| 53 | 37 | 135 | 198 | 269 | 291 | 422 | 439 | 542 |
| 54 | 46 | 106 | 191 | 221 | 317 | 406 | 478 | 534 |
| 55 | 54 | 78 | 158 | 263 | 359 | 372 | 486 | 563 |
| 56 | 47 | 85 | 181 | 287 | 292 | 367 | 493 | 573 |
| 57 | 22 | 86 | 150 | 276 | 293 | 397 | 463 | 564 |
| 58 | 55 | 142 | 167 | 277 | 294 | 423 | 444 | 574 |
| 59 | 12 | 118 | 182 | 236 | 309 | 428 | 452 | 526 |
| 60 | 38 | 119 | 214 | 222 | 318 | 373 | 494 | 565 |
| 61 | 39 | 87 | 173 | 255 | 343 | 383 | 445 | 527 |
| 62 | 5 | 107 | 215 | 223 | 350 | 374 | 453 | 509 |
| 63 | 63 | 79 | 183 | 278 | 295 | 407 | 495 | 543 |
| 64 | 13 | 108 | 151 | 270 | 325 | 429 | 479 | 551 |
| 65 | 30 | 94 | 205 | 271 | 319 | 391 | 454 | 510 |
| 66 | 6 | 109 | 199 | 230 | 351 | 375 | 487 | 519 |
| 67 | 31 | 143 | 206 | 237 | 310 | 430 | 446 | 575 |
| 68 | 14 | 110 | 207 | 231 | 326 | 398 | 470 | 566 |
| 69 | 23 | 111 | 159 | 279 | 335 | 431 | 471 | 511 |
| 70 | 15 | 127 | 174 | 238 | 327 | 415 | 455 | 535 |
| 71 | 7 | 95 | 175 | 239 | 311 | 399 | 447 | 567 |

Figure 7:
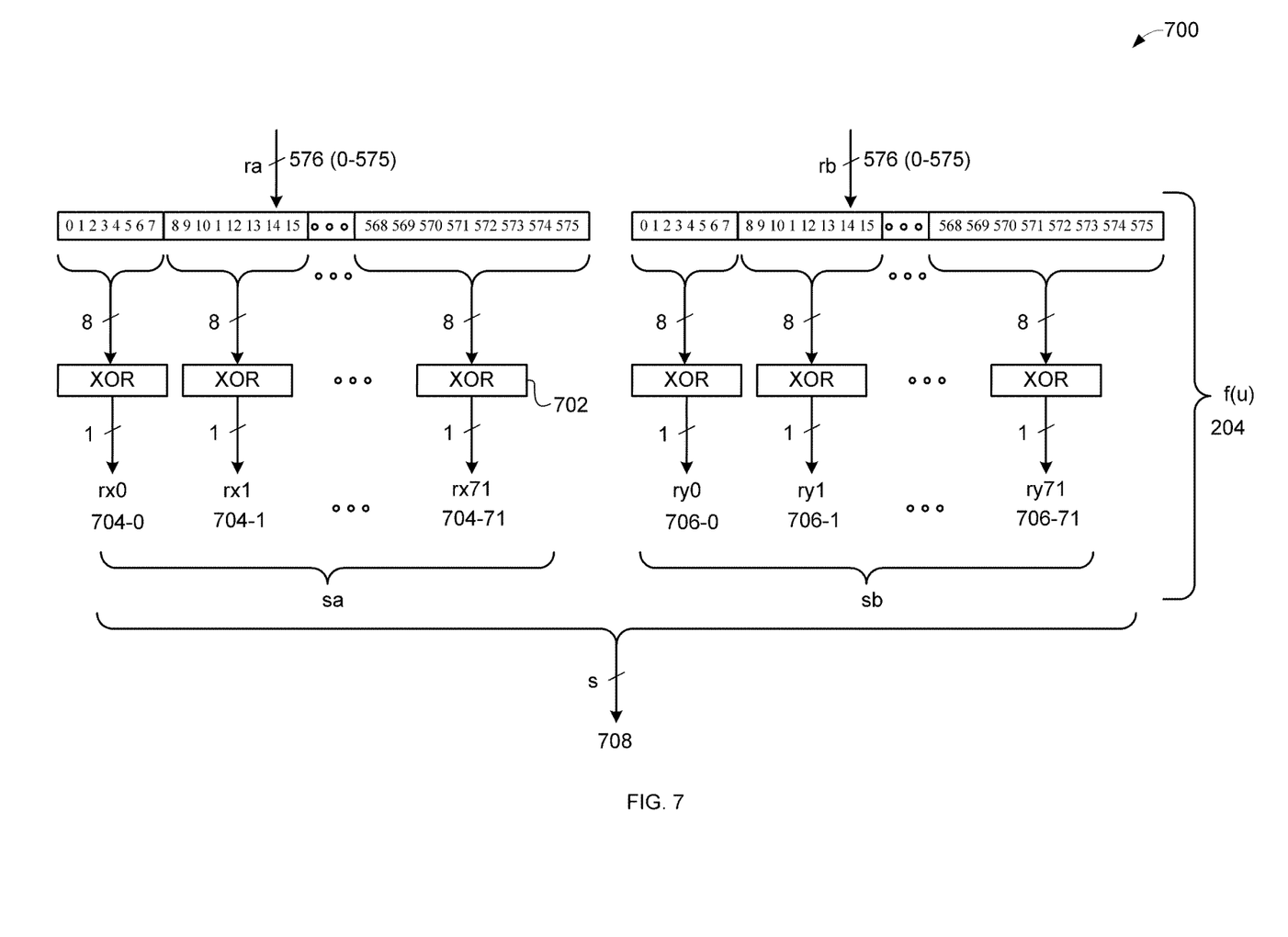
FIG. 7 illustrates one embodiment of the invention showing a combinatorial reduction in bit width.

FIG. 7 shows, generally at 700, an embodiment of the invention showing the function f(u) as shown in FIG. 2 at 204. Function f(u) represents a combinatorial block. Illustrated are the 576 bits from ra and rb in FIG. 6. Here in FIG. 7 are 576 bits ra and 576 bits rb. As illustrated each group of 8 bits from ra are exclusive-ORd (XOR) as shown by representative XOR block 702. The output of each XOR block are rx0 704-0, rx1 704-1, through rx71 704-71. Likewise the 756 bits from rb result in 72 outputs for the respective groups of 8 inputs handled by each XOR block the outputs denoted ry0 706-0, ry1 706-1, through ry71 706-71. Collectively the 72 outputs from ra (rx0 through rx71) and the 72 outputs from rb (ry0 through ry71) are denoted as output 708 of width s. Width s is width sa plus width sb.

While the embodiment in FIG. 7 illustrates sequential groupings of 8 bits, the invention is not so limited and any groupings of 8 bits can be used and need no be consistent from one XOR block to the next. That is, any XOR block function that results in, in this example, 576 bits being reduced to 72 bits can be used.

Figure 8:
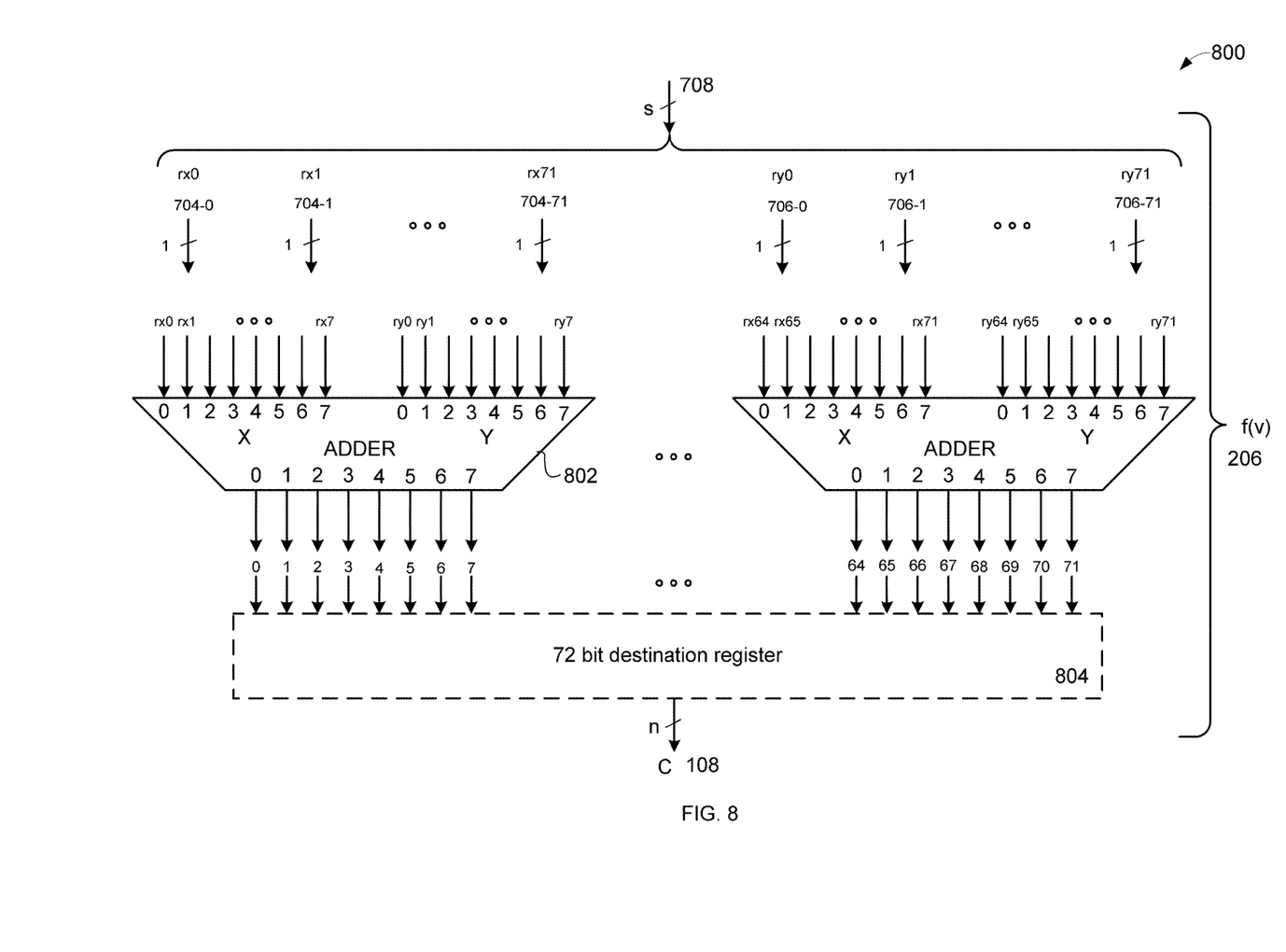
FIG. 8 illustrates one embodiment of the invention showing an arithmetic reduction in bit width.

FIG. 8 shows, generally at 800, an embodiment of the invention showing the function f(v) as shown in FIG. 2 at 206. Function f(v) represents an arithmetic block. Illustrated are the 72 bits from ra (rx0-rx71) and 72 bits from rb (ry0-ry71) which combined are output 708 of width s in FIG. 7. Here in FIG. 8 nine groups of 8 bits from rx0-rx71 and ry0-ry71 are added together in a representative ADDER block shown at 802. The 9 ADDER blocks result in 72 bits being generated which in one embodiment are optionally stored in a 72 bit destination register 804. The output 108 has a width of n which in this case is 72.

In FIG. 8 ADDER block as represented by 802 can be an 8 bit adder without a carry in or carry out. The invention is not so limited and while an 8 bit adder can be used, one of skill in the art will appreciate that as long as the two groups of 72 bits (144 bits total) are computed to 72 bits this will suffice. For example the ADDER block can in fact be a unit that performs subtraction. Additionally in yet other possible embodiments the ADDER block can be an arithmetic logic unit (ALU) supporting 4 to 16 or more bit widths.

Figure 9:
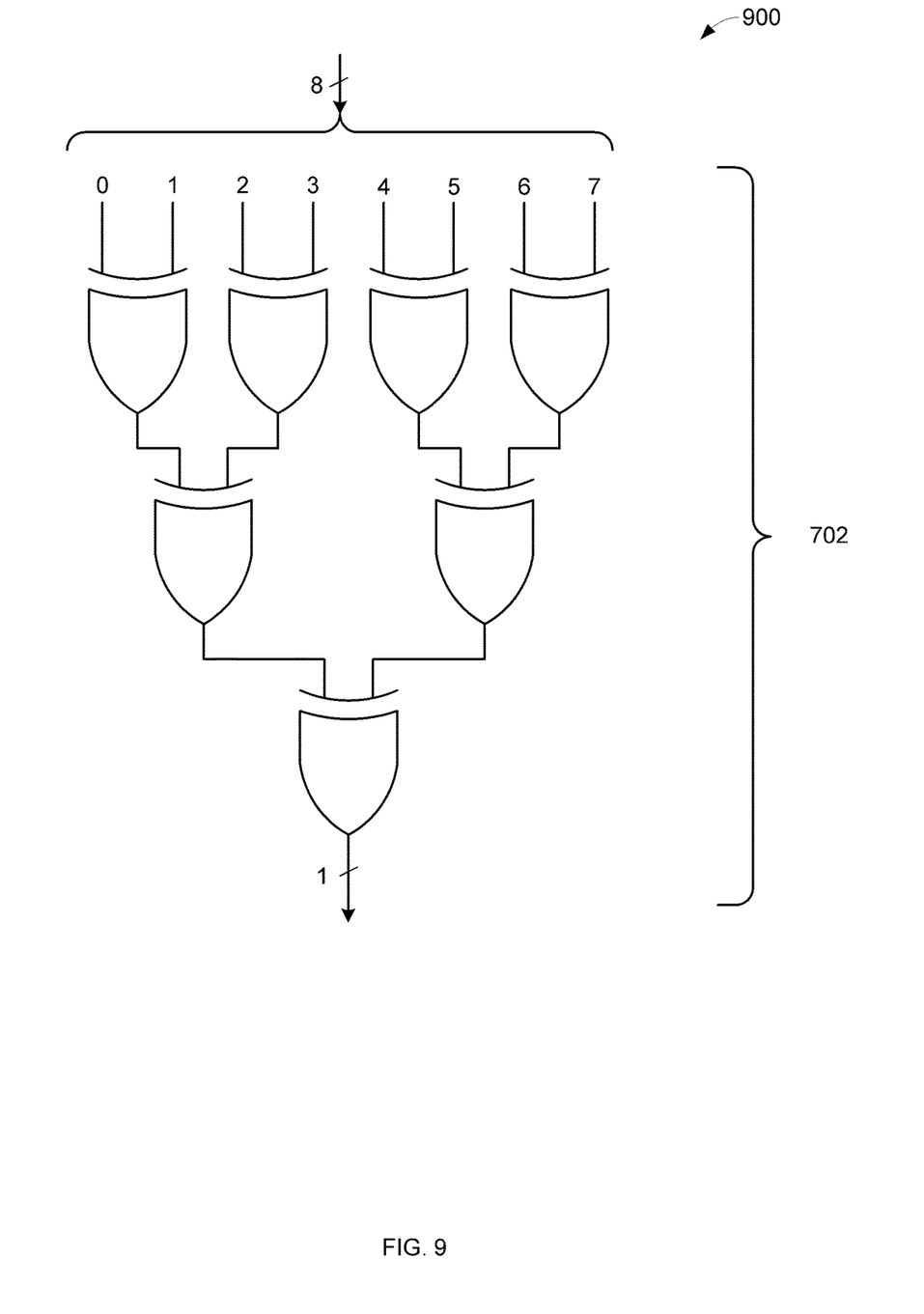
FIG. 9 illustrates one embodiment of the invention showing one embodiment of a combinatorial circuit.

FIG. 9 shows, generally at 900, an embodiment of the invention showing details on one embodiment of the representative XOR block 702. As can be seen 8 inputs are combined into 1 output using exclusive-OR gates.

Figure 10:
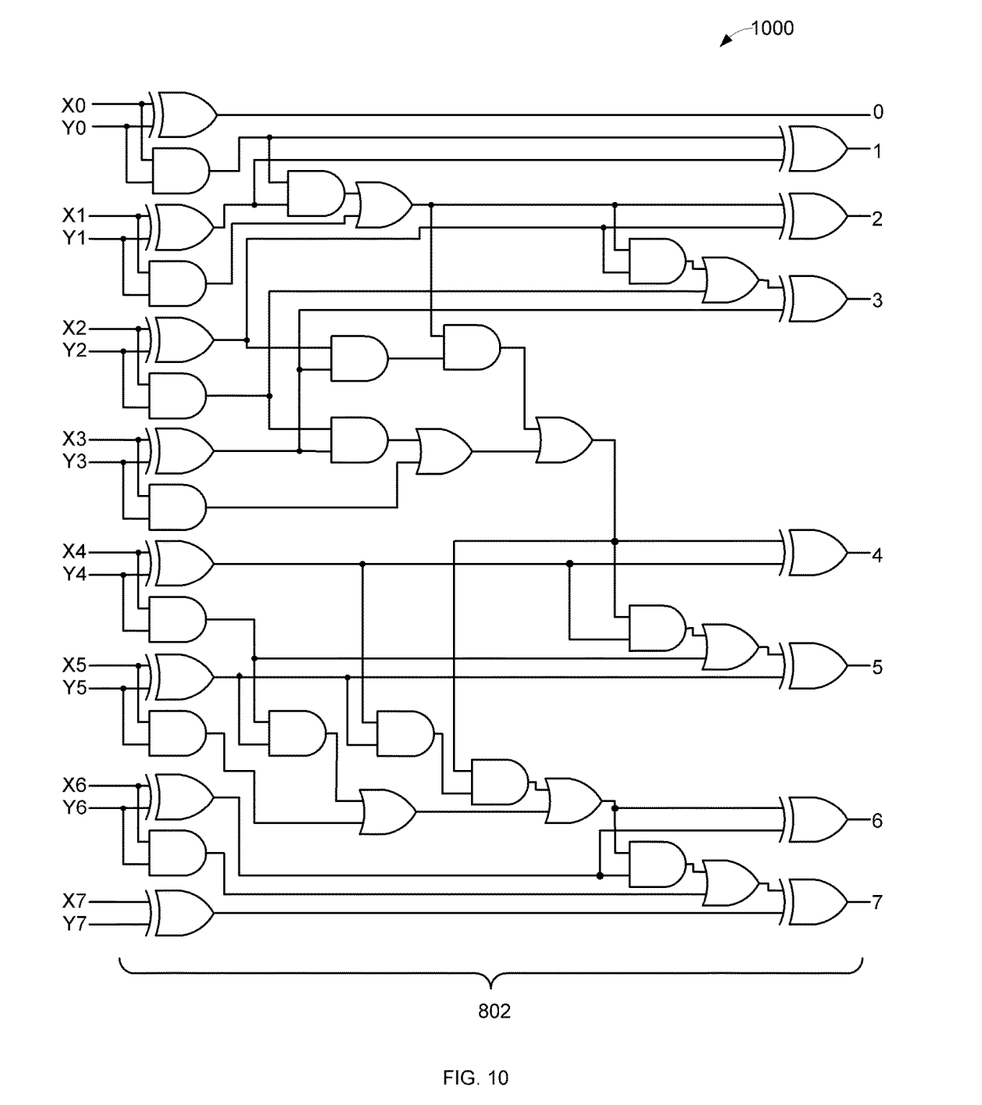
FIG. 10 illustrates one embodiment of the invention showing one embodiment of an arithmetic circuit.

FIG. 10 shows, generally at 1000, an embodiment of the invention showing details on one embodiment of the representative ADDER block 802. As can be seen 8 inputs from X (X0-X7) are combined with 8 inputs from Y (Y0-Y7) into 8 outputs (0-7).

Figure 11:
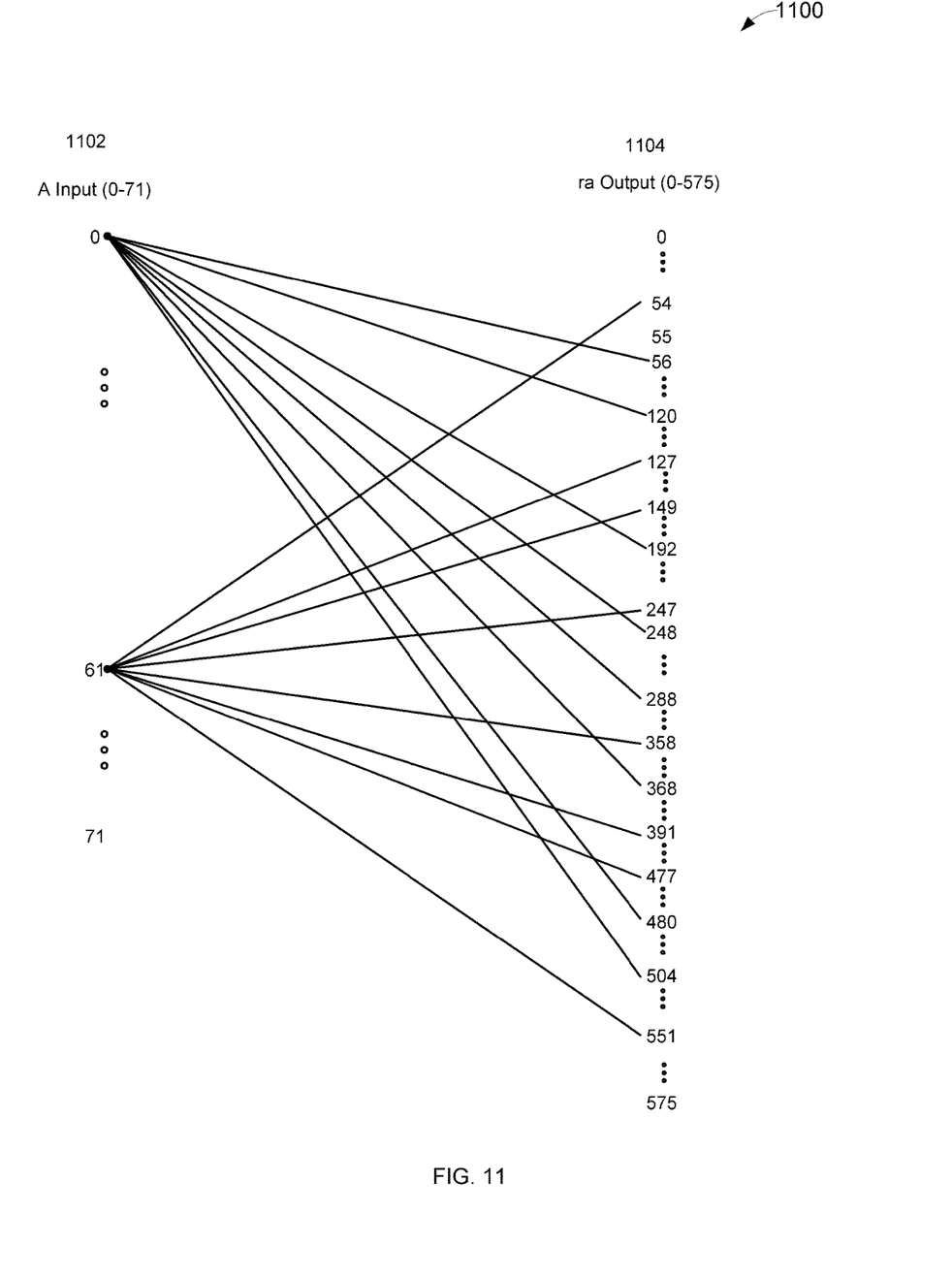
FIG. 11 illustrates one embodiment of the invention showing some more detail of a random connection.

FIG. 11 illustrates, generally at 1100, one embodiment of the invention showing some more detail of a random connection according to Table 1 for 1102 A input 0 and 61 to 1104 ra Output in schematic form, for example 606 in FIG. 6.

Figure 12:
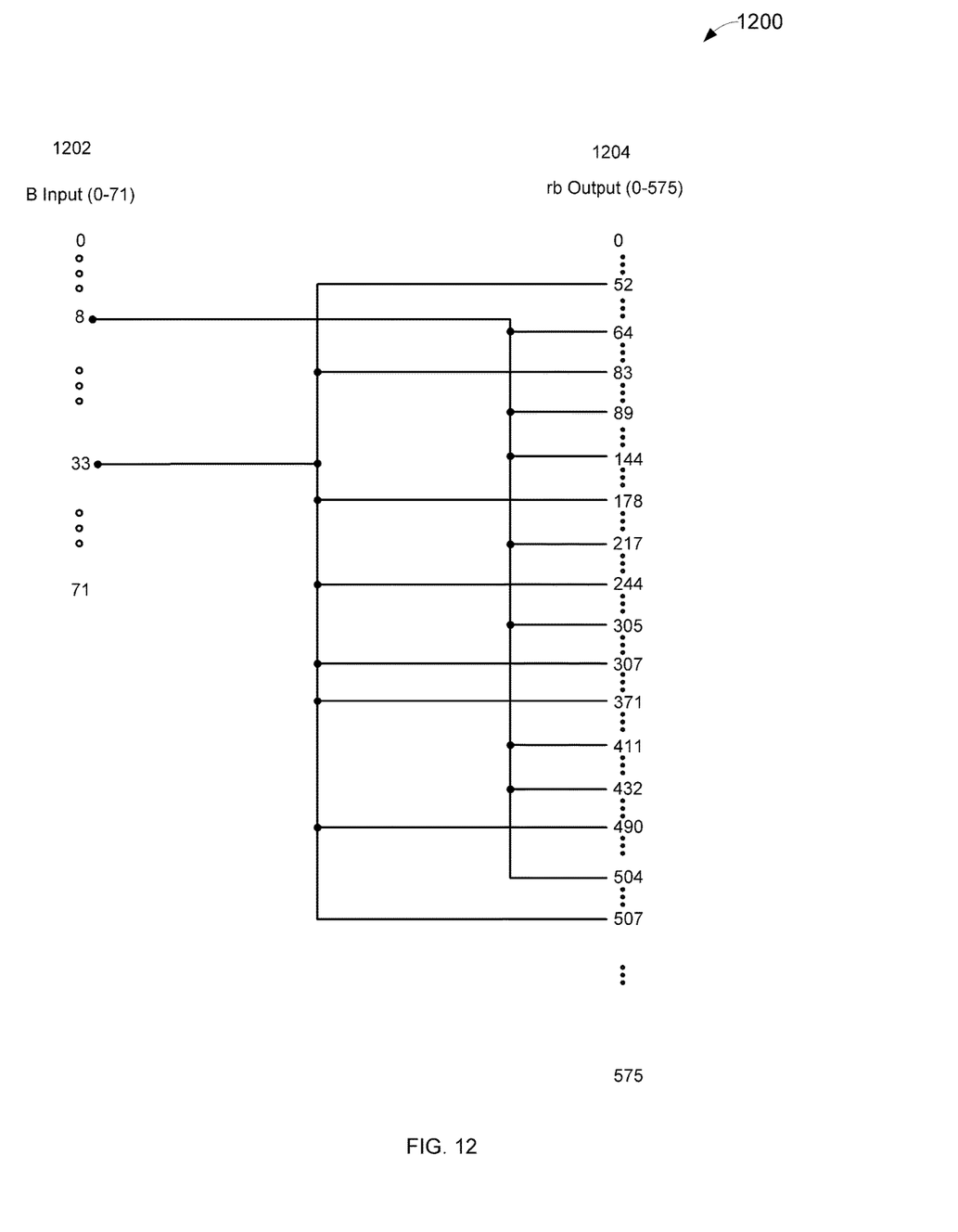
FIG. 12 illustrates one embodiment of the invention showing some more detail of a random connection.

FIG. 12 illustrates, generally at 1200, one embodiment of the invention showing some more detail of a random connection according to Table 1 for 1202 B input 8 and 33 to 1204 rb Output in schematic form, for example 606 in FIG. 6.

Thus a Method and Apparatus for Randomizer has been described.

For purposes of discussing and understanding the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention can be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments can be utilized and that logical, mechanical, electrical, and other changes can be made without departing from the scope of the present invention.

Some portions of the description may be presented in terms of algorithms and symbolic representations of operations on, for example, data bits within a system. These algorithmic descriptions and representations are used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic non-transitory signals capable of being transformed, stored, transferred, combined, compared, and otherwise manipulated. It has proven convenient at times, principally for reasons of common usage, to refer to these non-transitory signals as bits, values, elements, symbols, characters, terms, numbers, or the like.

It should be borne in mind, however, that all of these and similar terms are to be associated with the appropriate non-transitory physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a system, or similar electronic device, that manipulates and transforms data represented as physical (electronic) quantities within the system's registers and memories into other data similarly represented as physical quantities within the system memories or registers or other such information storage, non-transitory transmission, or display devices.

An apparatus for performing the operations herein can implement the present invention. This apparatus is specially constructed for the required purposes, or it may comprise a general-purpose controller, selectively activated or reconfigured by a program stored in the system, however it is not software alone. Such a program may be stored in a non-transitory readable storage medium, such as, but not limited to, any type of disk including floppy disks, hard disks, optical disks, compact disk-read only memories (CD-ROMs), and magnetic-optical disks, read-only memories (ROMs), random access memories (RAMS), electrically programmable read-only memories (EPROM)s, electrically erasable programmable read-only memories (EEPROMs), FLASH memories, magnetic or optical cards, etc., or any type of non-transitory media suitable for storing electronic instructions either local to the system or remote to the system.

The techniques presented herein are specifically related to a particular system or other apparatus. A specialized apparatus to perform the required methods is required. For example, any of the methods according to the present invention can be implemented in hard-wired circuitry specifically designed for the functionality disclosed, or by programming special hardware having, for example, in one embodiment, a particular machine such as a specifically designed arithmetic logic unit. As disclosed Applicant submits that any results are tied to a particular machine or apparatus and/or transform a particular article into a different non-transitory state or thing and that such particulars and/or things are non-trivial. The results of the specialized machine may return an electronic value and such a value can be stored in hardware on the specialized machine and transformed into a graphical representation that can be displayed to a user of the specialized machine. As disclosed Applicant submits that these results are tied to a particular machine or apparatus and/or transform a particular article into a different state or thing and that such particulars and/or things are non-trivial and as such satisfy Bilski. Nor are the techniques described abstract ideas because they require specialized hardware with specific limitations that are not abstract in nature and as such satisfy Alice.

The methods of the invention can be implemented using specialized hardware as noted supra. The methods of the invention cannot be implemented in software per se.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique can be, for example, implemented as executing code on a specialized system, the expression of that technique can be more aptly and succinctly conveyed and communicated as a formula, algorithm, or mathematical expression. Thus, one of ordinary skill in the art would recognize a block denoting A+B=C as an additive function whose implementation in hardware would take two inputs (A and B) and produce a summation output (C). Thus, the use of formula, algorithm, or mathematical expression as descriptions is to be understood as having a physical embodiment in hardware (such as a specialized system in which the techniques of the present invention can be practiced as well as implemented as an embodiment).

Those knowledgeable in the art understand the term padding to reflect the positioning of extra bits to an existing set of bits to make the resulting bits wider. Padding can be in front of or behind the existing bits. For example, the bits 000 are padding the bits 11111 here in front: 00011111 and behind here: 11111000. The padding bits can be of any value.

A machine-readable medium is understood to include any non-transitory mechanism for storing or transmitting information in a form readable by a machine. For example, a non-transitory machine-readable medium includes read only memory (ROM); random access memory (RAM); magnetic disk storage media; optical storage media; flash memory devices; and devices having non-transitory storage.

As used in this description, "substantially" or "substantially equal" or similar phrases are used to indicate that the items are very close or similar. A phrase such as "substantially equal" is used to indicate that they are for all practical purposes equal. A phrase such as "substantially uniform" is used to indicate that for all practical purposes the item under discussion can be considered uniform.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

It is to be understood that in any one or more embodiments of the invention where alternative approaches or techniques are discussed that any and all such combinations as may be possible are hereby disclosed. For example, if there are five techniques discussed that are all possible, then denoting each technique as follows: A, B, C, D, E, each technique may be either present or not present with every other technique, thus yielding 2^5 or 32 combinations, in binary order ranging from not A and not B and not C and not D and not E to A and B and C and D and E. Applicant(s) hereby claims all such possible combinations. Applicant(s) hereby submit that the foregoing combinations comply with applicable EP (European Patent) standards. No preference is given any combination.

Applicant has availed himself of the legal right to be his own lexicographer and such terms as, but not limited to, XOR, ADDER, etc. have specific meanings as denoted and/or explained.

Thus while particular embodiments and applications of the present invention have been illustrated and described, it is to be understood that the invention is not limited to the precise construction and components disclosed herein. Various modifications, changes and variations which will be apparent to one of skill in the art may be made in the arrangement, operation and details of the method and apparatus of the present invention disclosed herein without departing from the spirit and scope of the invention as defined in the claims.

Thus a Method and Apparatus for Randomizer has been described.

What is claimed is:

1. An apparatus for randomizing input data comprising; said apparatus having a first input, and a second input, said first input coupled to receive a first data input of width n bits where n equals a positive integer, and said second input coupled to receive a second data input of width n bits where said n equals said positive integer; a cross connection block having a first input, a second input, a first output, and a second output, said first input operatively coupled to receive said first data input n bits and generate on said first cross connection block output data of width ra bits where ra equals a positive integer and ra is greater than n, and said second input operatively coupled to receive said second data input n bits and generate on said second cross connection block output data output of said width rb bits where rb equals a positive integer and where r denotes a first number of width bits equal to ra plus rb, and r is greater than n; a combinatorial block having a first group of inputs, a second group of inputs, a first group of outputs, and a second group of outputs, said first group of inputs operatively coupled to receive said first cross connection block data output ra bits and generate on said combinatorial block first output data output of width sa bits, said second group of inputs operatively coupled to receive said second cross connection block data output rb bits and generate on said combinatorial block second output data of width sb bits, and where s denotes a second number of width bits equal to sa plus sb, and s is less than r; an arithmetic block having inputs and outputs, said inputs operatively coupled to receive said combinatorial block data output sa bits and said combinatorial block data output sb bits and generate on said arithmetic block outputs a data output of width n bits.

2. The apparatus of claim 1 wherein said n equals 72, said ra equals 576, rb equals 576, said sa equals 72, and sb equals 72.

3. The apparatus of clam 2 wherein said cross connection block first input is denoted A Input, said cross connection block second input is denoted B Input, and wherein means for A Input to said ra bits output, and means for said B Input to said rb bits output are listed in Table 1.

4. The apparatus of claim 1 further comprising a first storage register connected between said first data input n bits and said cross connection block first input, and a second storage register connected between said second data input n bits and said cross connection block second input.

5. The apparatus of claim 1 further comprising a storage register of said width n connected to said arithmetic block outputs.

6. The apparatus of claim 1 wherein said cross connection block output data of width ra bits are generated by being electrically directly coupled to said first data input n bits.

7. The apparatus of claim 6 wherein said cross connection block output data of width rb bits are generated by being electrically directly coupled to said second data input n bits.

8. The apparatus of claim 7 wherein said first cross connection block data output ra bits are operatively coupled to a first plurality of exclusive-or gates.

9. The apparatus of claim 8 wherein said second cross connection block data output rb bits are operatively coupled to a second plurality of exclusive-or gates.

10. The apparatus of claim 8 wherein said arithmetic block comprises a plurality of adders, said adders without a carry-in or carry-out.

11. The apparatus of claim 8 wherein said arithmetic block comprises a plurality of eight bit adders, said eight bits adders without a carry-in or carry-out, and wherein said combinatorial block data output sa bits and said combinatorial block data output sb bits are operatively coupled to said plurality of eight bit adders such that for each of said plurality of eight bit adders eight inputs are from said combinatorial block data output sa bits and eight inputs are from said combinatorial block data output sb bits and no such combinatorial block data output sa bits and said combinatorial block data output sb bits are connected to more than a single one of said plurality of eight bit adders.

12. The apparatus of claim 1 wherein said combinatorial block comprises a plurality of exclusive-or gates of depth three from said first group of inputs to said first group of outputs.

13. The apparatus of claim 12 wherein said combinatorial block comprises a plurality of exclusive-or gates of depth three from said second group of inputs to said second group of outputs.

14. A method for randomizing input data of width 2E bits on an input circuit, the method comprising:
    (a) randomly connecting each of said data 2E input bits on the input circuit to G output bits on an output circuit where G>2 resulting in G×2E bits;
    (b) exclusive-ORing pairs of said G×2 E bits in an XOR block for producing a result of G×E bits; and
    (c) adding said G×E bits in an ADDER block producing a result of width E bits.

15. The method of claim 14 further comprising:
    (d) taking the result of (c) of width E bits and duplicating the E bits to achieve a result of 2E width and using this 2E width as input to step (a) and proceeding to step (c).

16. The method of claim 15 further comprising:
(e) taking the result of (c) of width E bits from claim 15 and duplicating the E bits to achieve a result of 2E width and using this 2E width as input to step (a).

17. The method of claim 16 further comprising:
(e) taking the result of (c) of width E bits from claim 16 and duplicating the E bits to achieve a result of 2E width and using this 2E width as input to step (a).

18. The method of claim 14 further comprising:
(d) taking the result of (c) of width E bits and generating a logic zero input of width E bits and padding said result of (c) of width E bits with said zero input of width E bits to achieve a result of 2E width and using this 2E width as input to step (a) and proceeding to step (c), said padding consisting of a position selected from the group consisting of before said result of (c) of width E bits or after said result of (c) of width E bits.

19. The method of claim 14 further comprising:
(d) taking the result of (c) of width E bits and generating a logic one input of width E bits and padding said result of (c) of width E bits with said zero input of width E bits to achieve a result of 2E width and using this 2E width as input to step (a) and proceeding to step (c), said padding consisting of a position selected from the group consisting of before said result of (c) of width E bits or after said result of (c) of width E bits.

20. A method comprising:
(a) receiving on an input circuit a data word having a data width of W bits;
(b) determining if said number W is even; and
  (b 1) when not padding said data word with a single fixed value data bit;
  (b 2) when so splitting said data word into two equal halves resulting in two W/2 sets;
(c) mapping each of said two W/2 sets into T×W/2 outputs on an output circuit, wherein T is an integer greater than 4;
(d) exclusive-ORing said T×W/2 outputs into (T/2)×W/2 or fewer outputs denoted Q; and
(e) arithmetically in an ADDER block reducing said Q outputs to produce an output having W/2 bits.

* * * * *